United States Patent
C et al.

(10) Patent No.: US 9,684,986 B1
(45) Date of Patent: Jun. 20, 2017

(54) CONSTRUCTING FONTS FROM SCANNED IMAGES FOR RENDERING TEXT

(71) Applicant: Amazon Technologies, Inc., Seattle, WA (US)

(72) Inventors: Prannoy Vargis C, Kottayam (IN); Tony Johri, Lucknow (IN); Adarsh Natarajan, Chennai (IN)

(73) Assignee: AMAZON TECHNOLOGIES, INC., Seattle, WA (US)

(*) Notice: Subject to any disclaimer, the term of this patent is extended or adjusted under 35 U.S.C. 154(b) by 110 days.

(21) Appl. No.: 14/630,729

(22) Filed: Feb. 25, 2015

(51) Int. Cl.
*G06T 11/60* (2006.01)

(52) U.S. Cl.
CPC .................................. *G06T 11/60* (2013.01)

(58) Field of Classification Search
CPC ........................................................ G06T 11/60
See application file for complete search history.

(56) References Cited

U.S. PATENT DOCUMENTS

| 5,659,638 | A * | 8/1997 | Bengtson | G06K 9/685 |
| | | | | 382/240 |
| 9,384,389 | B1 * | 7/2016 | Sankaranarayanan | |
| | | | | G06K 9/00456 |
| 2003/0123732 | A1 * | 7/2003 | Miyazaki | G06K 9/00449 |
| | | | | 382/186 |
| 2007/0176802 | A1 * | 8/2007 | Fay | G06F 17/2217 |
| | | | | 341/50 |
| 2012/0206751 | A1 * | 8/2012 | Bradshaw | G06F 3/1208 |
| | | | | 358/1.13 |
| 2013/0294695 | A1 * | 11/2013 | Meunier | G06K 9/6828 |
| | | | | 382/182 |
| 2015/0067484 | A1 * | 3/2015 | Sumio | G06F 3/04883 |
| | | | | 715/251 |
| 2015/0339271 | A1 * | 11/2015 | Xing | G06F 17/22 |
| | | | | 715/244 |
| 2016/0062970 | A1 * | 3/2016 | Sadkin | G06F 17/212 |
| | | | | 715/233 |

* cited by examiner

*Primary Examiner* — Kee M Tung
*Assistant Examiner* — Grace Q Li
(74) *Attorney, Agent, or Firm* — Eversheds Sutherland (US) LLP

(57) ABSTRACT

Systems, methods, and computer-readable media are disclosed for constructing fonts from scanned images. In one embodiment, a method may include receiving a scanned image with a first glyph and a second glyph that correspond to a character in the image. The method may include generating an image representative of each of the first glyph and the second glyph, determining a default positioning of the first character, determining a positional reference line indicative of an alignment of certain characters, and a third positional reference line indicative of an alignment of different characters. The method may include determining an adjustment for the first glyph by determining a distance between the default positioning and the second positional reference line. The method may include assigning an identifier to the first glyph and generating a font file to be executed by a renderer for rendering the source text.

20 Claims, 5 Drawing Sheets

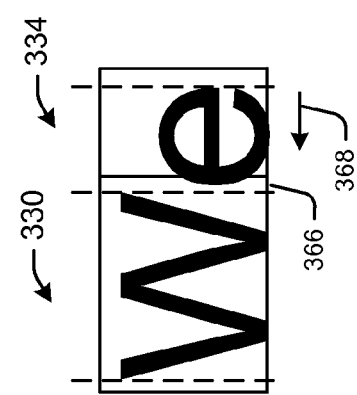
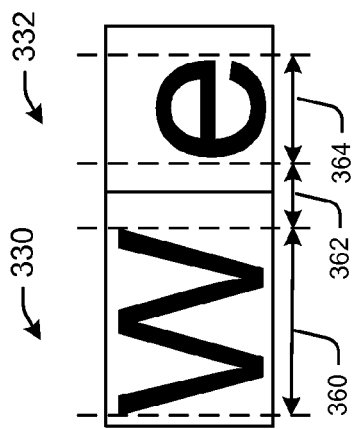
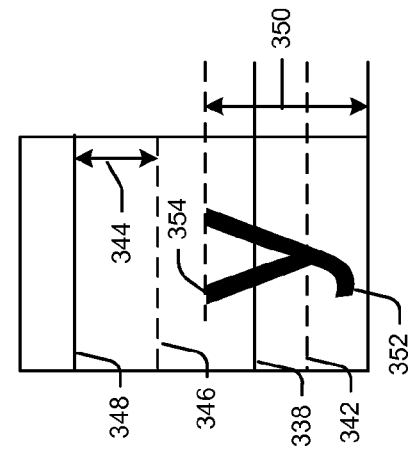
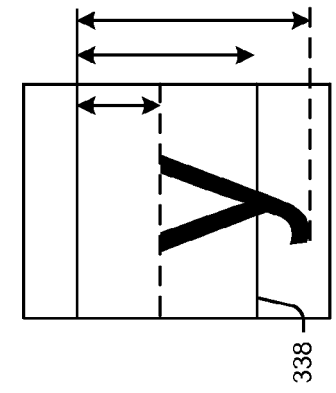
FIG. 3
FIG. 4

Unicode 110

Unicode 109

CONSTRUCTING FONTS FROM SCANNED IMAGES FOR RENDERING TEXT

BACKGROUND

Digitizing print media, such as documents and books, may facilitate accessibility to the media by creating digital forms of the print media. Users may access the digital form of the print media on a device instead of accessing the print media itself. Further, many users may access the digital form of the print media simultaneously. However, print media may include unique characters or fonts selected by, for example, an author which may be difficult to accurately reproduce in digital form or otherwise present on a device. Users and/or authors may desire accurate reproduction of print media in digital form.

BRIEF DESCRIPTION OF THE DRAWINGS

FIGS. 3-6 schematically illustrate an example use case in accordance with one or more embodiments of the disclosure.

Figure 1:
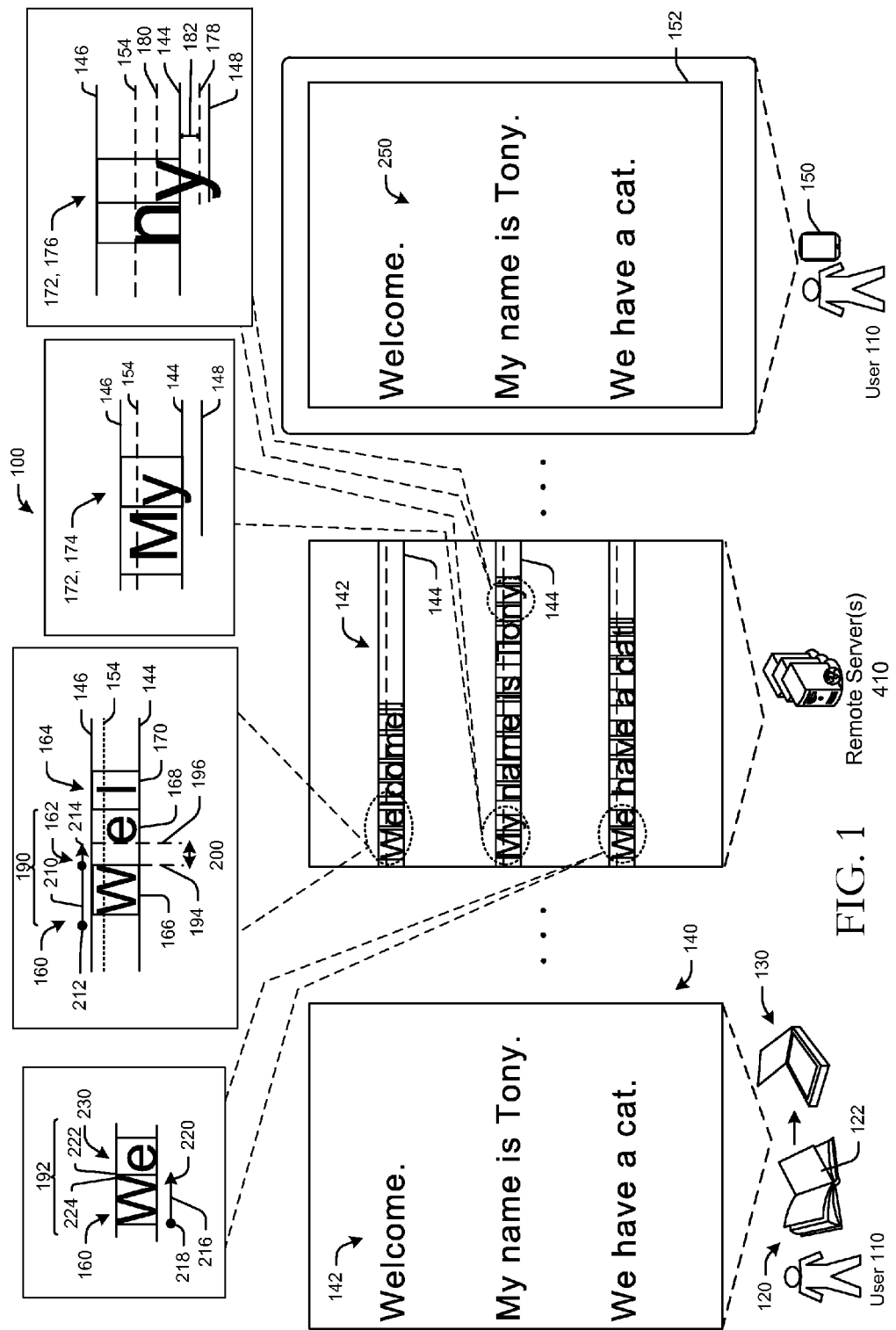
FIG. 1 is a schematic diagram of example functionality provided by a system in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

This disclosure relates to, among other things, systems, methods, computer-readable media, techniques, and methodologies for constructing font files from scanned images. More specifically, this disclosure relates to rendering text using the font files constructed from scanned images. Scanned images may include, without limitation, scanned images of print media such as books, documents, magazines, newspapers, handwritten letters, historical documents, drawings, and the like. Scanned images may include scanned text content, graphical content, or the like. While example embodiments of the disclosure may be described in the context of scanned images with text content, it should be appreciated that the disclosure is more broadly applicable to any form of content included in scanned images.

The systems and methods described herein may facilitate rendering of text, in any language, on a reading platform while maintaining a shape of glyphs, or a font, of the original print media. In certain embodiments, the systems and methods described herein may generate text renderings that are accurate and faithful reproductions of the original print media. Certain embodiments of the disclosure may leverage hardware accelerated rendering software for improved performance.

Typefaces or fonts included in print media may be selected or otherwise designated by authors or publishers for various reasons. For example, an author may select a specific font to convey information or to emphasize portions of text. In another example, an author may italicize or bold a font to alert a reader to specific text. Authors or publishers may further select a font or typeface for readability or to facilitate ease of reading. Accordingly, digital reproductions of print media that accurately replicate the original print media may preserve author-intended effects conveyed by fonts or typefaces in the original print media.

Certain embodiments of the disclosure provide accurate and faithful digital reproductions of print media. A typeface, as described herein, may include a set of one or more fonts. Fonts may include a set of one or more glyphs. A glyph may be a symbol representative of a readable character that conveys information to a reader. More specifically, a glyph may be indicative of an individual letter or character of an alphabet, a number, a symbol, a punctuation mark, and/or another symbol. Fonts may be indicated by one or more of a particular size, weight, and/or style of a typeface. For example, Times New Roman may be considered a typeface, and Times New Roman—Italics may be considered a font. "Font" and "typeface" may be used interchangeably herein. Fonts may be vector fonts, such that different sizes of the font or typeface may be generated from a single vector font.

Example embodiments of the disclosure relate to systems, methods, computer-readable media, techniques, and methodologies for rendering text by constructing font files from scanned images, such that digital reproductions of a source text or scanned image are accurate and faithful to the source text or scanned image.

Referring to FIG. 1, an overview of an example environment 100 is depicted in accordance with one or more embodiments of the disclosure. In the environment 100, a user 110 may have a source text or print media sample, such as a book 120. In other examples, the user may have print media such as a handwritten document or other print media. The user 110 may desire to digitize a portion of the book 120, such as a page 122 of the book 120. The user 110 may use a scanning device 130, such as a scanner, a camera, or another device configured to generate a digital image, to scan the page 122 of the book 120. The scanning device 130 may scan the page 122 of the book 120 and may generate a scanned image 140 of the page 122. The scanned image 140 may include text 142 and may be a digital image in any suitable data and/or file format for digital rendering.

The scanned image 140 may be sent, for example via a wired or wireless network, to one or more remote server(s) 410 for processing, and subsequently to a user device 150 for rendering. In other embodiments, the scanned image 140 may be sent to one or more user devices directly for processing and rendering. The remote server 410 may be in communication with the scanning device 130 and/or user device 150 via one or more networks. The user device 150 may be operated by the user 110 to consume electronic content, such as a digital reproduction of the page 122 of the book 120. The user device 150 may be configured to render digital content on a display 152 of the user device 150 by executing one or more modules stored in one or more memory devices of the user device 150 via one or more computer processors.

The remote server 410 may receive the scanned image 140 and may identify glyphs representative of characters or other symbols included in the scanned image 140 by analyzing the scanned image 140. Glyphs may be representative of characters used in the text 142 of the scanned image 140. For example, in FIG. 1, the remote server 410 may identify a first glyph 160 of "W," a second glyph 162 of "e" positioned adjacent to the first glyph 160, a third glyph 164 of "l," and so forth. The remote server 410 may identify bounding regions for each glyph by analyzing the scanned image 140. A bounding region may be a bounding box, or a rectangle within which the entire glyph fits. In some embodiments, a bounding region may be a rectangle having the smallest area within which the entire glyph fits, or otherwise encompassing the glyph. Bounding regions may be indicated, for example, in font units, pixel units, or other units. In FIG. 1, the remote server 410 may identify a first bounding region 166 for the first glyph 160, a second bounding region 168 for the second glyph 162, a third bounding region 170 for the third glyph 164, and so forth.

Upon identifying the bounding regions for each respective glyph included in the scanned image 140, the remote server 410 may extract, from the scanned image 140, at least one of every glyph included in the scanned image 140 and may generate an image corresponding to the respective extracted glyph. For example, although the word "Welcome" in FIG. 1 includes two "e" glyphs, an image for a single "e" glyph may be generated rather than generating an image for each instance of the "e" glyph in the scanned image 140. In some embodiments, each instance of each glyph may be extracted, and corresponding images may be generated. Generated images may be in vector image format, and may be generated by converting the extracted glyph to vector format.

The extracted glyphs may be categorized or binned to form a set of binned glyphs. Binning may include processing the extracted glyphs to determine matching glyphs and aggregating matching glyphs together as the set of binned glyphs. For example, each instance of a glyph such as the "e" glyph may be binned, such that one "e" glyph is linked to each instance of the "e" glyph. Matching may be performed by comparing one glyph against another, and if the glyphs have a threshold level of similarity, the glyphs may be binned together. The tolerance or threshold level of similarity may be dynamic and based at least in part on a total number of glyphs included in the scanned image 140. Binning may reduce an overall data file size by reducing a number of vector images included in the data file, since a single vector image may be linked to multiple instances of a glyph.

The extracted glyphs, or in some embodiments the binned glyphs, may be vectorized into contours to form vector images. Vectorizing, or generating vector images, may include using one or more Bezier curves to model a glyph that may be scaled indefinitely. In one example, a glyph may be recursively split until portions forming the glyph are sufficiently linear and can be formed from a series of linear or circular segments. In another example, Bezier curves may be converted to non-uniform rational basis splines that can be incrementally rendered without recursive splitting.

The remote server 410 may generate identifiers for each glyph included in the scanned image 140. In some embodiments, the remote server 410 may generate identifiers for each extracted glyph, or for each glyph in the set of binned glyphs. The identifiers may be unique and/or custom and may be associated with glyphs as glyph data. For example, the identifiers may be Unicode values. The remote server 410 may associate each glyph, each extracted glyph, or each glyph in the set of binned glyphs with an identifier, such as a Unicode value. For example, in FIG. 1, the remote server 410 may associate the first glyph 160 with a first Unicode value, the second glyph 162 with a second Unicode value that is different than the first Unicode value, and the third glyph 164 with a third Unicode value that is different than the first Unicode value and the second Unicode value. The Unicode values may be associated with the respective glyphs as glyph data. The Unicode values may be selected from Private Use Areas of Unicode values.

The remote server 410 may determine a positional adjustment for one or more instances of glyphs that have either or both a vertical or a horizontal positioning that is different than a default vertical or horizontal positioning as determined by other instances of the particular glyph in the scanned image 140. Upon identifying the glyphs included in the scanned image 140, the remote server 410 may determine or otherwise identify a typographic baseline 144 of the text 142 included in the scanned image 140. The typographic baseline 144 may be a virtual line upon which most glyphs "rest" or "sit" and for which glyphs with descending portions, such as "g" or "y" extend below. The typographic baseline 144 may be a default baseline for the text 142 identified by analyzing the scanned image 140, and may be determined for the entire scanned image 140 or for individual lines of text. Based at least in part on the typographic baseline 144, the remote server 410 may determine an ascent 146 indicative of a positioning along which a top end of capital letter characters may touch, a descent 148 indicative of a positioning along which a bottom end of descending letter characters may touch (e.g., "g," "y," "p," etc.), and a mean line 154 indicative of a positioning along which a top end of lower case letter characters may touch.

Upon identifying the typographic baseline 144, the remote server 410 may identify that a glyph occurs in different instances (e.g., different words or lines, etc.) in the scanned image 140, where one instance of the glyph has a vertical positioning, or a glyph baseline specific to the instance of the glyph, that is different than vertical positioning or a glyph baseline of another instance of the glyph. Vertical positioning, or baseline positioning, may be determined by comparing a top end of a glyph representative of a lower case letter character to the mean line 154, or by comparing a top end of a glyph representative of a capital letter character to the ascent 146, or by comparing a bottom end of a glyph representative of a descending letter character to the descent 148. Vertical positioning may be determined by other suitable methods in other embodiments, such as via a Cartesian coordinate system used to map the glyphs, and the like.

For example, in FIG. 1, the remote server 410 may identify a fourth glyph 172 representative of "y" in the scanned image 140. The user device 150 may generate a vector image associated with the fourth glyph 172. The vector image may be an image including one or more Bezier curves to model the fourth glyph 172 that may be scaled indefinitely. As described, the vector image may be generated by recursively splitting a glyph until portions forming the glyph are sufficiently linear and can be formed from a series of linear or circular segments. In another example, Bezier curves may be converted to non-uniform rational basis splines that can be incrementally rendered without recursive splitting. The fourth glyph 172 may occur at a first instance 174 and at a second instance 176 in the scanned image 140. Although illustrated as occurring on the same line of text, the first instance 174 and the second instance 176 of the fourth glyph 172 may occur on different lines or locations of the scanned image 140. The remote server 410 may identify that the second instance 176 of the fourth glyph 172 has a glyph baseline 178 that is different than the typographic baseline 144 of the first instance 174 of the fourth glyph 172. Because the first instance 174 is aligned with the typographic baseline 144, the first instance 174 may be identified as having a default baseline value with a default resting position at the typographic baseline 144. The remote server 410 may determine positioning of a top end 180 of the second instance 176 of the fourth glyph 172 and compare the positioning of the top end 180 to a top end of the first instance 174 of the fourth glyph 172 which aligns with the mean line 154 to determine the glyph baseline 178 for the second instance 176 of the fourth glyph 172. In some embodiments, positioning of a bottom end of a glyph may be used to determine positioning of a top end of the glyph, and/or to determine a glyph baseline for the glyph.

To maintain accuracy of the digital representation of the page 122 captured in the scanned image 140, the remote server 410 may determine a baseline adjustment value for the second instance 176 of the fourth glyph 172 indicative of a vertical translation to be applied to the second instance 176 during rendering. The baseline adjustment value may be determined by determining a distance 182 between the glyph baseline 178 and the typographic baseline 144. The baseline adjustment value may be indicative of the distance 182, for example via a positive or negative numerical value indicating a distance and direction of vertical baseline adjustment for the second instance 176. In other embodiments, the baseline adjustment value may be based at least in part on a difference between top end and/or bottom end positioning differences between the first instance 174 and the second instance 176 of the fourth glyph 172 with respect to the typographic baseline 144, the ascent 146, and/or the descent 148

The remote server 410 may generate a fifth glyph and fifth glyph data for the second instance 176 of the fourth glyph 172 to account for the baseline adjustment value. In one embodiment, the remote server 410 may duplicate the fourth glyph 172 and the fourth glyph data to generate the fifth glyph and the fifth glyph data, and replace the default baseline adjustment value with the baseline adjustment value for the second instance 176. The fifth glyph may be linked to the same vector image of "y" as the fourth glyph 172. The fifth glyph may be associated with or assigned a unique identifier or Unicode value. As a result, during rendering of the fifth glyph (or the second instance 176 of the fourth glyph 172 in FIG. 1), the "y" will be translated such that the "y" as rendered appears at the same vertical position as in the scanned image 140.

In another example of positional adjustment, the remote server 410 may determine an inter-character spacing, or horizontal, adjustment for one or more instances of glyphs that have a horizontal positioning that is different than a default horizontal positioning as determined by other instances of the particular glyph in the scanned image 140. Horizontal positioning may be adjusted by a kerning adjustment value, as described herein.

Upon identifying glyphs in the scanned image 140, the remote server 410 may identify that instances of certain pairs of adjacent glyphs have kerning, or horizontal spacing, that is different than a default kerning for other instances of the certain pair of adjacent glyphs. For example, in FIG. 1, the remote server 410 may identify a first instance 190 of a pair of the first glyph 160 and the second glyph 162. The remote server 410 may identify a second instance 192 of the first glyph 160 and the second glyph 162 at another portion of the scanned image 140. For the first instance 190 of the pair of glyphs, the remote server 410 may determine a default advance value for the first glyph 160 indicative of a distance 210 between an origin or a starting point 212 of the first glyph 160 and an origin or a starting point 214 of the second glyph 162 along the typographic baseline 144. The distance 210 may be designated as a default advance value for either or both the first glyph 160 or the second glyph 162. Default advance values may be determined by analyzing each instance of a pair of glyphs and determining distances between respective origins or start points. The most common distance may indicate the default advance value. The remote server 410 may determine an advance value for the first glyph 160 of the second instance 192 of the pair of glyphs indicative of a distance 216 between an origin or a starting point 218 of the first glyph 160 and an origin or a starting point 220 of the second glyph 162 along the typographic baseline 144.

The remote server 410 may determine that the distance 216 for the second instance 192 of the pair of glyphs is different than the distance 210 for the first instance 190 of the pair of glyphs. The remote server 410 may determine that the second instance 192 of the pair of glyphs form a kerning pair. The remote server 410 may determine a kerning value of the kerning pair by identifying a distance 222 between an ending point 224 of the first glyph 160 and the starting point 220 of the second glyph. The kerning adjustment value may be indicative of a kerning or horizontal positioning adjustment, such as an addition or subtraction, to the default advance value of the first glyph 160.

The remote server 410 may generate a sixth glyph 230 and sixth glyph data associated with the second glyph 162 in the second instance 192 of the pair of glyphs to account for the kerning adjustment value. In one example, the sixth glyph 230 may be generated by duplicating the second glyph 162 and the second glyph data, and replace the default kerning value with the kerning adjustment value for the glyph of the second instance 192 of the pair of glyphs. The sixth glyph 230 may be linked to the same vector image of "y" as the second glyph 162. The sixth glyph 230 may be associated with or assigned a unique identifier or Unicode value. As a result, during rendering of the sixth glyph (or the second instance 192 of the second glyph 162 in FIG. 1), the "e" will be translated such that the "e" as rendered appears at the same horizontal position with respect to the first glyph representative of "W" as in the scanned image 140.

In other embodiments, the remote server 410 may determine kerning adjustment values by determining distances between adjacent glyphs. For the first instance 190 of the pair of glyphs, the remote server 410 may determine a distance 200 between an end point 194 of the first glyph 160 and a start point 196 of the second glyph 162. The distance 200 may be a default kerning value and may be associated with either or both the first glyph data or the second glyph data. Default kerning values may be determined by analyzing each instance of a pair of glyphs and determining distances between respective end points and start points. The most common distance may indicate the default kerning value. Horizontal positioning may be determined by other suitable methods in other embodiments, such as via a Cartesian coordinate system used to map the glyphs, and the like.

The remote server 410 may generate a font file configured to be executed by a renderer to render the source text of the scanned image 140. The font file may include the first glyph, the first identifier or Unicode value, the second glyph, the second identifier or Unicode value, the third glyph, the third identifier or Unicode value, the fourth glyph, the fourth identifier or Unicode value, the fifth glyph, the fifth identifier or Unicode value, the sixth glyph, and the sixth identifier or Unicode value. Each Unicode value may be different than the others. The font file may further include vector images, where each glyph is linked to at least one vector image. Each glyph may further include related glyph data, which may include positional adjustment information as described herein. The font file may include only data for glyphs included in the scanned image 140, and may not include other information, such as glyphs that were not included in the scanned image 140. For example, because the glyph "z" was not included in the scanned image 140, it may not be included in the font file.

The remote server 410 may generate a renderable format based at least in part on the font file and the scanned image. The renderable format may be converted to generate digital content, such as HTML content, digital document content, pdf content, and the like, using the identifiers or Unicode values referenced in the font file. For example, a renderable format may be HTML and an intermediate renderable format may be generated and converted to other forms of digital content. Respective content renderers can then render the generated digital content on any platform. For example, a browser can render HTML files. In FIG. 1, the user device 150 may receive the renderable format from the remote server 410, and may render a digital version of the scanned image 140 based at least in part on the scanned image and the font file. The user device 150 may scale or upscale each glyph included in the font file to a uniform resolution, which may be indicated by dots per inch. For example, a first glyph may have a resolution of 800 dpi and a second glyph may have a resolution of 400 dpi. The user device 150 may upscale or scale each glyph to 400 dpi, 500 dpi, 800 dpi, 2400 dpi, or another resolution. Accordingly, variation in glyph size due to differing resolution while rendering contours through font may be avoided. The user device 150 may render the source text on the display 152 based at least in part on the scanned image 140 and the font file. The user device 150 may generate content 250 for presentation on the display 152 of the user device 150. The content 250 may be an accurate digital reproduction of the scanned image 140, and the page 122 of the original print media, or book 120.

In some embodiments, the remote server 410 and/or the user device 150 may reflow the source text of the scanned image 140. For example, the user device 150 may be configured to increase or decrease a font size or size of glyphs included in the scanned image 140, and, as a result, the user device 150 may reflow the text from a first rendered line of text to a second or subsequent line, such that words of the text appear in the same order, but not necessarily on the same line, as in the scanned image 140. Further, the remote server 410 and/or the user device 150 may be configured to align glyphs of the scanned image 140 to a common baseline to facilitate rendering and/or readability, and may further automatically adjust glyph sizing to accommodate a display size of the user device 150, while retaining the appearance of the respective glyph.

Accordingly, the systems, methods, computer-readable media, techniques, and methodologies described herein may generate accurate digital reproductions of print media independent of a language of the print media. Although discussed herein in the context of books and scanned images, the systems, methods, and apparatuses of the disclosure may be applicable to other forms of print media and electronic content, such as videos, pictures, webpages, and other forms of images.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

The techniques are described below with reference to the following devices and processes. However, it is to be appreciated that a number of other devices may also employ these techniques. Furthermore, as used herein, the term "scanned image" may include any type of content which can be stored and distributed in digital form. By way of illustration, and without limitation, scanned images of print media can include all forms of textual information such as books, magazines, newspapers, newsletters, periodicals, journals, reference materials, telephone books, textbooks, anthologies, proceedings of meetings, forms, directories, maps, manuals, guides, references, photographs, articles, reports, documents, etc.

Example embodiments of the disclosure can provide a number of features and/or technical effects. For example, in accordance with example embodiments of the disclosure, the systems and methods described herein may facilitate rendering of text, in any language, on a reading platform while maintaining a shape of glyphs, or a font, of the original print media. In certain embodiments, the systems and methods described herein may generate text renderings that are accurate and faithful reproductions of the original print media. Certain embodiments of the disclosure may leverage hardware accelerated rendering software for improved performance. It should be appreciated that the above examples of features and/or technical effects of example embodiments of the disclosure are merely illustrative and not exhaustive.

While FIG. 1 illustrates one example system for implementing the disclosed techniques, it is to be appreciated that multiple other devices and architectures may implement the described techniques. Moreover, the operations described above for the system shown in FIG. 1 are not limiting and many variations and/or additional functions of the described system are contemplated within the scope of this disclosure.

Illustrative Processes and Use Case

Figure 2:
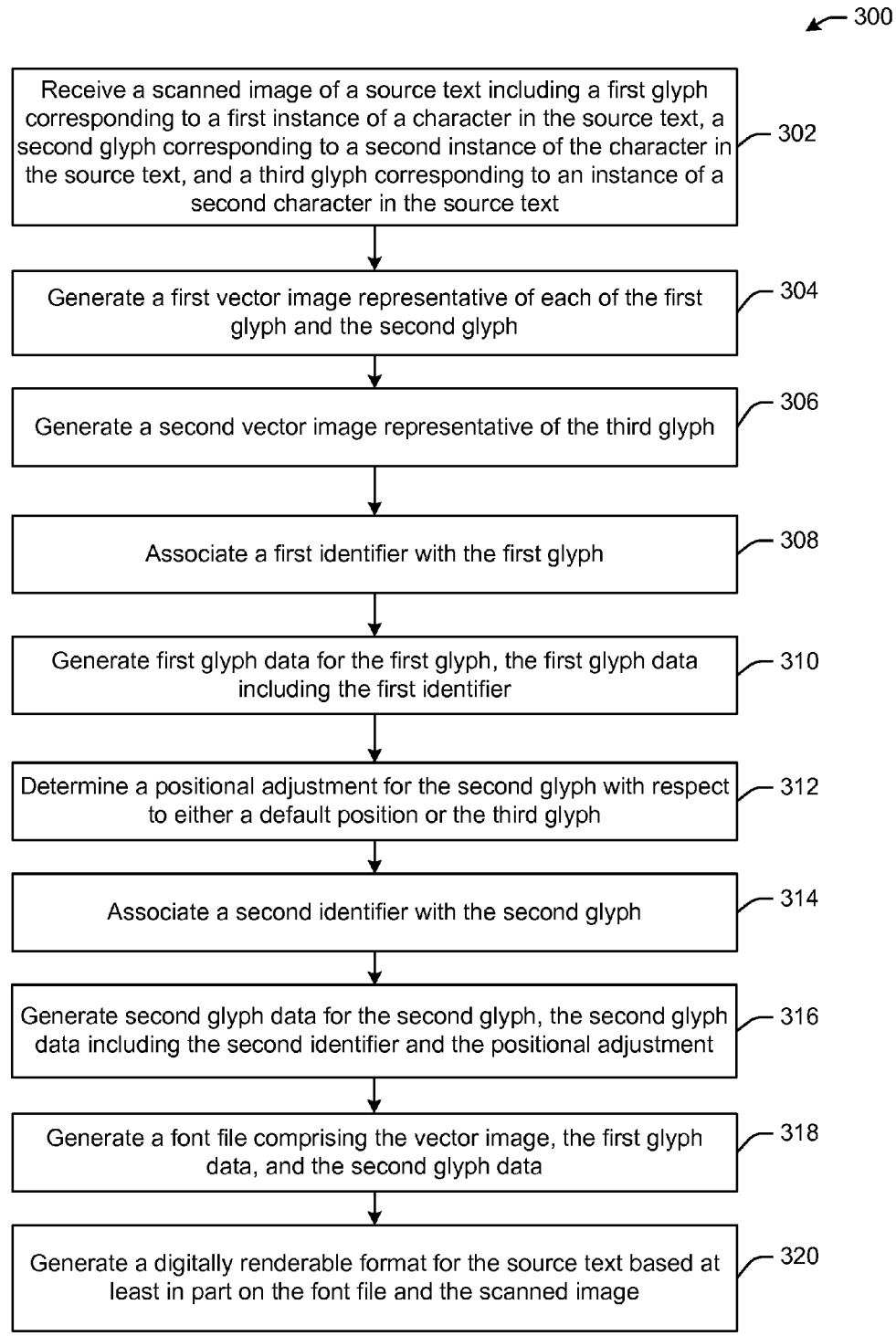
FIG. 2 is an illustrative process flow for constructing font files for digitally rendering scanned text in accordance with one or more example embodiments of the disclosure.

FIG. 2 depicts an illustrative process or method 300 for rendering text by constructing fonts from an image in accordance with one or more embodiments of the disclosure, and will be discussed in conjunction with the schematic illustrations of FIGS. 3-6. In example embodiments, the method 300 may be performed to render an accurate digital reproduction of a source text or source image. While the operations of method 300 may be described in the illustrative context of a book, it should be appreciated that the method 300 is more broadly applicable to other types of print media. The method 300 may be performed, in one example, by the user device 150 of FIG. 1.

Figure 5:
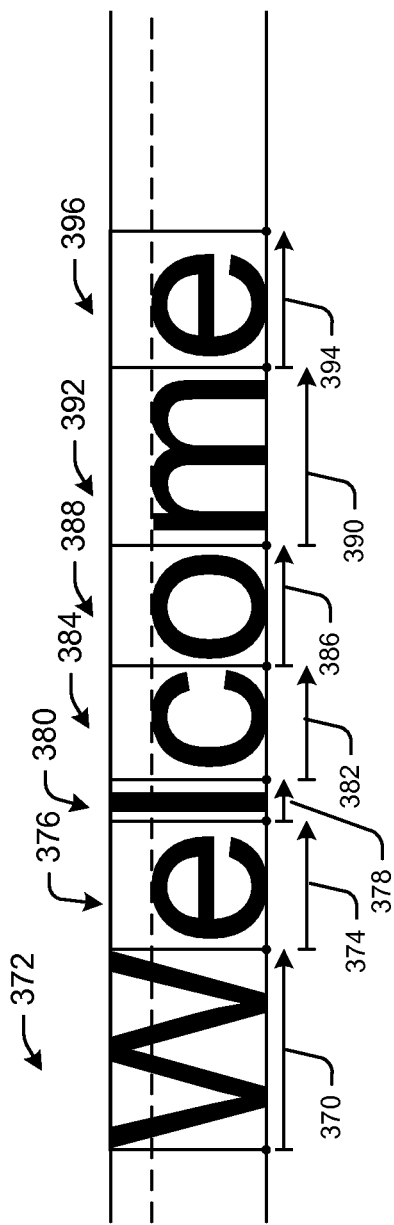
Figure 6:
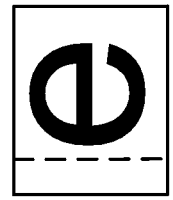
Figure 6:
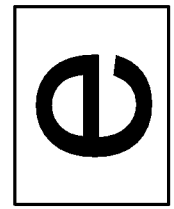

In FIG. 2, block 302 of the method 300 includes receiving a scanned image of a source text including a first glyph corresponding to a first instance of a character in the source text, a second glyph corresponding to a second instance of the character in the source text, and a third glyph corresponding to an instance of a second character in the source text. For example, in FIGS. 3 and 4, a scanned image of a source text may be received including a first instance 330 of a "W," a second instance 332 of the "W," a second character of "e" 334 positioned adjacent to the second instance 332, and a "y" 336 as a third character. Glyphs may be generated for each character, such as a first glyph for the first instance of "W" a second glyph for the second instance of "W," a third glyph for either the "e" or the "y", and so forth. In FIG. 5, an illustration of text "Welcome" is depicted in example processing. Respective glyphs for "W," "e," "l," "c," "o," "m," and "e" may be identified, extracted, binned, and/or vectorized in accordance with embodiments. Advance values for each respective glyph may be determined and associated with the glyphs as glyph data. For example, advance value 370 may be associated with glyph 372, advance value 374 may be associated with glyph 376, advance value 378 may be associated with glyph 380, advance value 382 may be associated with glyph 384, advance value 386 may be associated with glyph 388, advance value 390 may be associated with glyph 392, and advance value 394 may be associated with glyph 396.

At block 304, the method 300 includes generating a first image, such as a vector image, representative of each of the first glyph and the second glyph. In FIGS. 3 and 4, a first image may be generated representative of "W." Block 306 includes generating a second vector image representative of the third glyph. For example, in FIGS. 3 and 4, vector images of glyphs generated for the "e" and "y" characters 334, 336.

At block 308, the method includes associating a first identifier with the first glyph. In FIG. 3, for example, the first instance 330 of "W" may be associated with a Unicode value. At block 310, the method includes generating first glyph data for the first glyph, the first glyph data including the first identifier. For example, glyph data for first instance of the "W" 330 may be generated and may be linked to or otherwise associated with the vector image of "W" and the first identifier.

At block 312, the method 300 includes determining a positional adjustment for the second glyph with respect to either a default position or the third glyph. For example, a positional adjustment for the second instance of "W" 332 may be determined in FIGS. 3-5 as a vertical positional adjustment with respect to the first instance of "W" 330 which may be a default position of "W," or in another example, as a horizontal positional adjustment for the "e" glyph with respect to the glyph of "W." In another example in FIG. 4, a vertical position adjustment may be determined for the glyph generated for the character "y" 340. As described herein, positional adjustments may include horizontal and/or vertical positioning adjustments. Vertical adjustments may be indicated by baseline adjustment values and horizontal adjustments may be indicated by kerning adjustment values. Positional adjustments may further be determined based on default horizontal or vertical positioning of not only the same glyph, but also based at least in part on adjacent characters, a word in which the glyph appears, a line on which the glyph appears, or a combination thereof.

Baseline adjustment values may be determined by a number of methods. In one example method, baseline adjustment values may be determined by determining a typographic baseline indicative of a default resting position for the first character and the second character, and determining a first baseline adjustment value of the first glyph by comparing a first glyph baseline to the typographic baseline. In FIG. 4, the typographic baseline from which glyphs may have an origin or may rest upon may be represented by typographic baseline 338. The first glyph baseline may be indicative of a first glyph resting position, as shown in a second instance 340 of "y" with a resting position along glyph baseline 342. Vertical positioning or baseline adjustment may be determined by calculating a first distance 344 between a mean line 346 and an ascent 348, or a second distance 350 between a bottom end 352 of the glyph and a top end 354 of the glyph, or any other suitable method. The method may include generating first glyph data associated with the first glyph, the first glyph data including the first baseline adjustment value and a first vector image representative of the first character. The first glyph may be assigned a first Unicode value. The method may further include determining a second baseline adjustment value of the second glyph by comparing a second glyph baseline to the first glyph baseline, the second glyph baseline indicative of a second glyph resting position. The method may include determining that the second baseline adjustment value is different than the first baseline adjustment value, and duplicating the first glyph data to generate second glyph data associated with the second glyph, the second glyph data including the first baseline adjustment value. In some embodiments, the second glyph data may be generated without duplicating the first glyph data. The method may include modifying the second glyph by replacing the first baseline adjustment value of the second glyph data with the second baseline adjustment value, and assigning the second glyph a second Unicode value that is different than the first Unicode value.

Kerning adjustment values may be determined by a number of methods. In one example method with reference to FIG. 3, kerning adjustment values may be determined by determining a default advance value 360 for the first glyph 330 indicative of a distance between a starting point of the first glyph and a starting point of a fourth glyph along the typographic baseline, the fourth glyph representative of a third character having a default kerning value. The method may include associating the default advance value for the first glyph with the first glyph data and the second glyph data, and determining that the third glyph and the first glyph form a first kerning pair indicated by the third glyph positioned adjacent to the first glyph such that a distance between the starting point of the first glyph and a starting point of the third glyph along the typographic baseline is different than the default advance value. A distance 362 between an end of the "W" and a beginning of the "e" may be calculated, as well as a width 364 of the "e." The method may include determining a first kerning value of the first kerning pair by identifying a first distance between an ending point of the first glyph and the starting point of the third glyph along the typographic baseline, the first kerning value indicative of a kerning adjustment to the default advance value of the first glyph, and generating third glyph data associated with the third glyph, the third glyph data including the first kerning value and a second vector image representative of the second character. The method may include assigning the third glyph a third Unicode value that is different than the first Unicode value and the second Unicode value, and determining that the third glyph and the second glyph form a second kerning pair by identifying that a second distance between an ending point of the second glyph and the starting point of the third glyph along the typographic baseline is different than the first distance. For example, in FIG. 6, a glyph representing "e" may have two different Unicode values that indicate different kerning adjustments. The method may include determining a second kerning value of the second kerning pair based on the second distance, the second kerning value indicative of a kerning adjustment to the default advance value associated with the second glyph data, and duplicating the third glyph and the third glyph data to generate a fifth glyph and fifth glyph data associated with the fifth glyph, where the fifth glyph data including the first kerning value. The method may include modifying the fifth glyph by replacing the first kerning value of the fifth glyph data with the second kerning value, and assigning the fifth glyph a fourth Unicode value that is different than the first Unicode value, the second Unicode value, and the third Unicode value. In FIG. 3, a distance 366 between the "W" and "e" after kerning may be illustrated by shifting the "e" in direction 368.

Referring back to FIG. 2, at block 314, the method includes associating a second identifier with the second glyph. For example, the second glyph may be the glyph for "y" shown in FIG. 4 and may have a Unicode value that is different than the Unicode value for another instance of "y." At block 316, the method includes generating second glyph data for the second glyph, the second glyph data including the second identifier and the positional adjustment, which in the example illustrated in FIG. 4 would be a vertical adjustment and could be a horizontal or kerning adjustment in other embodiments. Block 318 includes generating a font file comprising the vector image, the first glyph data, and the second glyph data. The font file may also include glyph data for other glyphs. At block 320, the method includes generating a digitally renderable format for the source text based at least in part on the font file and the scanned image. Renderable formats, such as HTML, pdf, or another digital renderable format, may be generated based at least in part on the font file and the scanned image.

The font file may be used to render a digital reproduction of the source text. In some embodiments, the glyphs may be scaled to a uniform resolution. The source text may be rendered on a display based at least in part on the font file.

It should be noted, that the method 300 may be modified in various ways in accordance with certain embodiments of the disclosure. For example, one or more operations of method 300 may be eliminated or executed out of order in other embodiments of the disclosure. Additionally, other operations may be added to method 300 in accordance with other embodiments of the disclosure.

In another embodiment of a method for rendering text by constructing fonts from an image in accordance with the disclosure, a remote server, such as the remote server 410 of FIG. 1, may receive a scanned image of a source text including a first glyph and a second glyph, where the first glyph and the second glyph correspond to a first instance and a second instance of a character in the source text. The first instance of the character may appear in a first word of the source text and the second instance of the character appears may appear in a second word of the source text, where the first word includes a first group of characters and the second word including a second group of characters. The remote server may generate a vector image representative of each of the first glyph and the second glyph, where the vector image is resizable and formed of Bezier curves representing the respective glyph. The remote server may determine a first horizontal reference line indicative of a default vertical alignment of the first instance of the character with respect to the first group of characters, where the first horizontal reference line indicates a resting position of the first instance of the character. The remote server may determine a second horizontal reference line indicative of a vertical alignment of the first group of characters and a third horizontal reference line indicative of a vertical alignment of the second group of characters. The remote server may determine a first vertical distance value between the first horizontal reference line and the second horizontal reference line, and may assign a first numerical identifier to the first glyph. The remote server may generate first glyph data associated with the first glyph, the first glyph data including the first numerical identifier and the first vertical distance value, and may determine a second vertical distance value for the second glyph by determining a second vertical distance value between the first horizontal reference line and the third horizontal reference line. The remote server may determine that the second vertical distance value is different than the first vertical distance value, and may assign a second numerical identifier to the second glyph, where the second numerical identifier is different from the first numerical identifier. The remote server may generate second glyph data associated with the second glyph, the second glyph data including the second vertical distance value, and may generate a font file configured to be executed by a renderer to render the source text, the font file including the vector image, the first glyph data, and the second glyph data. In some instances, the remote server may generate a renderable format based at least in part on the font file and the scanned image.

The remote server may further identify a third glyph corresponding to a first character adjacent to the character in the first word and a fourth glyph corresponding to a second character in the second word, and may determine that the first character is the same as the second character. The remote server may determine a first vertical reference line indicative of a default horizontal alignment of the first instance of the character on the second horizontal reference line with respect to the first group of characters, where the first vertical reference line indicates an origin of the first instance of the character, and may determine a second vertical reference line indicative of a horizontal alignment of the second instance of the character on the third horizontal reference line with respect to the second group of characters, as well as a third vertical reference line indicative of a default horizontal alignment of the second group of characters. The remote server may determine a first horizontal distance value for the third glyph by determining a horizontal distance value between the first vertical reference line and the second vertical reference line, and may assign a third numerical identifier to the third glyph. The remote server may generate third glyph data associated with the third glyph, the third glyph data including the third numerical identifier and the first horizontal distance value, and may determine a second horizontal distance value for the fourth glyph by determining a second horizontal distance value between the second vertical reference line and the third vertical reference line. The remote server may determine that the second horizontal distance value is different than the first horizontal distance value, and assign a fourth numerical identifier to the fourth glyph, where the fourth numerical identifier is different from the third numerical identifier. The remote server may generate fourth glyph data associated with the fourth glyph, the fourth glyph data including the second horizontal distance value, where the font file further comprises the third glyph data and the fourth glyph data.

In some embodiments, the remote server may determine that the first instance of the character has a first resolution, determine that the second instance of the character has a second resolution that is less than the first resolution, and may upscale the second character to the first resolution, such that each instance of the character is at the first resolution.

Figure 7:
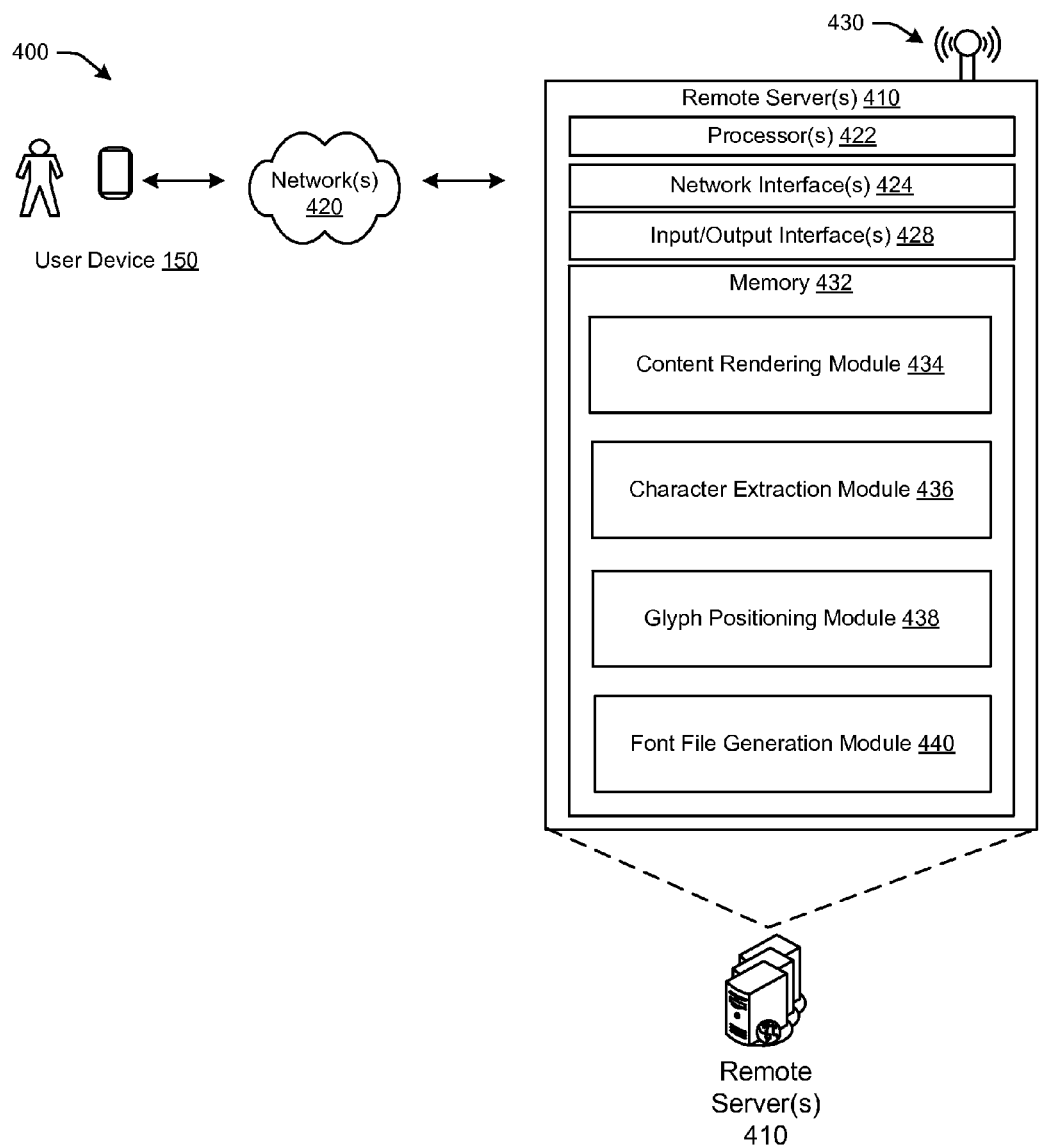
FIG. 7 is a schematic illustration of another example system architecture in accordance with one or more example embodiments of the disclosure.

The above described example color blending determinations are merely examples and the implementations of the techniques disclosed herein are not so limited. As would be understood by one of ordinary skill in the art in view of this disclosure, any number of variations or alternative determination may be used without departing from the scope of this disclosure.

Illustrative Device Architecture FIG. 7 is a schematic illustration of the example remote server 410 of FIG. 1 operating in an example network environment 400 in accordance with one or more example embodiments of the disclosure. Although described herein in the context of remote server 410, one or more components of the remote server 410 or operations of methods described herein may be performed partially or entirely by another device, such as the user device 150 of FIG. 1. The remote server 410 may be in communication with the remote server 410 via one or more networks 420. The remote server 410 may be any suitable user device including, but not limited to, a mobile device such as a smartphone, tablet, e-reader, or the like; a desktop computer; a laptop computer, a game console, a personal media player, a wearable computer device, and so forth. The remote server 410 may render digital content.

As illustrated, the remote server 410 includes one or more processor(s) 422, one or more network interface(s) 424, one or more input/output ("I/O") interface(s) 428, an antenna 430, and a memory 432. The remote server 410 may also include various additional components, such as one or more input device(s), configured to interact with the I/O interface 428, that allow the user 110 to operate the remote server 410. The remote server 410 may also include an operating system configured to provide an interface between software and hardware resources of the remote server 410, and/or database management systems configured to support functionality of the memory 432. The remote server 410 may include system busses that functionally couple various components of the remote server 410. In other embodiments, the remote server 410 may include additional or fewer components.

The processor(s) 422 may be configured to access the memory 432 and execute computer-executable instructions loaded therein. For example, the processor(s) 422 may be configured to execute computer-executable instructions of the various program modules of the remote server 410 to cause or facilitate various operations to be performed in accordance with one or more embodiments of the disclosure. The processor(s) 422 may include any suitable processing unit capable of accepting data as input, processing the input data in accordance with stored computer-executable instructions, and generating output data. The processor(s) 422 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 422 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 422 may be capable of supporting any of a variety of instruction sets.

The network interface(s) 424 may be configured to allow the remote server 410 to communicate with content providers and other entities over networks (e.g., network 134 of FIG. 1), such as local-area networks (LANs), wide-area networks (WANs), the Internet, wireless networks, wireless wide-area networks (WWANs), cable television networks, telephone networks, cellular communications networks, combinations of the foregoing, and/or the like. Further, such networks may have any suitable communication range associated therewith and may include, for example, metropolitan area networks (MANs) or personal area networks (PANs). In addition, such networks may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

One or more input/output (I/O) interfaces 428 may be provided that may facilitate the receipt of input information by the remote server 410 from one or more I/O devices as well as the output of information from the remote server 410 to the one or more I/O devices. The I/O devices may include, for example, one or more user interface devices that facilitate interaction between a user and the remote server 410 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The antenna 430 may include any suitable type of antenna(s) depending, for example, on the communications protocols used to transmit or receive signals via the antenna 430. Non-limiting examples of suitable antennas may include directional antennas, non-directional antennas, dipole antennas, folded dipole antennas, patch antennas, multiple-input multiple-output (MIMO) antennas, or the like. The antenna 430 may be communicatively coupled to one or more transceivers or radio components to which or from which signals may be transmitted or received. The antenna 430 of the remote server 410 may include, without limitation, a cellular antenna for transmitting or receiving signals to/from a cellular network infrastructure, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), 5G standards, direct satellite communications, or the like. Other example antennas 158 include a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth.

The antenna 430 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the antenna 430 may be configured to transmit or receive radio frequency signals within any suitable frequency range forming part of the unlicensed portion of the radio spectrum.

The remote server 410 may include a transceiver with any suitable radio component(s) for, in cooperation with the antenna 430, transmitting or receiving radio frequency (RF) signals in the bandwidth and/or channels corresponding to the communications protocols utilized by the remote server 410 to communicate with other devices. The transceiver may include hardware, software, and/or firmware for modulating, transmitting, or receiving, potentially in cooperation with any of antenna 430, communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver may include any known receiver and baseband suitable for communicating via the communications protocols utilized by the remote server 410.

The memory 432 may include one or more program modules, applications, or the like, such as a content rendering module 434, a character extraction module 436, a glyph positioning module 438, and a font file generation module 440. Any of the modules may include one or more sub-modules. For example, the font file generation module 440 may include one or more Unicode value generation modules. Any of the modules depicted in FIG. 7 may include computer-executable code, instructions, or the like that may be loaded into the memory 432 for execution by one or more of the processor(s) 422. Further, any data may be loaded into the memory 432 for use by the processor(s) 422 in executing computer-executable code.

The memory 432 of the remote server 410 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory. The memory 432 may include removable and/or non-removable media which may be implemented in any method or technology for storage of information, such as computer-readable instructions, data structures, program modules, or other data.

In various implementations, the memory 432 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 432 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.). Other examples of memory include EEPROM, flash memory, CD-ROM, digital versatile disks (DVD) or other optical storage, magnetic cassettes, magnetic tape, magnetic disk storage, or other magnetic storage devices, RAID storage systems, or any other medium which can be used to store the desired information and which can be accessed by a computing device.

Referring now to functionality supported by the various program modules depicted in FIG. 7, the content rendering module 434 may include computer-executable instructions, code, or the like, that, responsive to execution by the processor 422, may cause digital content to be rendered on the display of the remote server 410, based at least in part on the font file generated by the systems and methods described herein.

The character extraction module 436 may include computer-executable instructions, code, or the like, that, responsive to execution by the processor 422, may function to identify glyphs, instances of glyphs, bounding regions, and the like from scanned images or source text. The character extraction module 436 may be configured to extract glyphs from scanned images or source text, perform binning and/or matching operations, and convert extracted glyphs to vector images.

The glyph positioning module 438 may include computer-executable instructions, code, or the like, that, responsive to execution by the processor 422, may function to determine vertical and horizontal positioning of glyphs included in source text or scanned images. The glyph positioning module 438 may be configured to identify kerning pairs, or glyphs that have baseline positioning different than a default baseline positioning for other instances of the glyph.

The font file generation module 440 may include computer-executable instructions, code, or the like, that, responsive to execution by the processor 422, may function to generate glyph data, generate duplicate glyphs, generate font files, link or associate glyphs with vector images, and generate Unicode values and assignments of Unicode values to glyphs.

While FIG. 7 illustrates one example device, it is to be appreciated that multiple other devices and architectures may implement the described techniques. For instance, the components illustrated as being located on or accessible to the remote server 410 may be located in any other location, such as on one or more of servers that are accessible to the device over a network, spread out amongst servers, located on other user devices, and/or the like.

It should further be appreciated that the remote server 410 may include alternate and/or additional hardware, software, or firmware components beyond those described or depicted without departing from the scope of the disclosure. More particularly, it should be appreciated that software, firmware, or hardware components depicted as forming part of the remote server 410 are merely illustrative and that some components may not be present or additional components may be provided in various embodiments. While various illustrative program modules have been depicted and described as software or data stored in the memory 432, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component including assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:
   receiving, by one or more computer processors, a scanned image of a source text comprising a first glyph and a second glyph, wherein the first glyph and the second glyph correspond to a first instance and a second instance of a character in the source text, respectively, and wherein the first instance of the character appears in a first word of the source text and the second instance of the character appears in a second word of the source text, the first word including a first group of characters and the second word including a second group of characters;
   generating, by the one or more computer processors, a vector image representative of each of the first glyph and the second glyph;

determining, by the one or more computer processors, a first horizontal reference line indicative of a default vertical alignment of the first instance of the character with respect to the first group of characters, wherein the first horizontal reference line indicates an origin of the first instance of the character;

determining, by the one or more computer processors, a second horizontal reference line indicative of a vertical alignment of the first group of characters and a third horizontal reference line indicative of a vertical alignment of the second group of characters;

determining, by the one or more computer processors, a first vertical distance value between the first horizontal reference line and the second horizontal reference line;

assigning, by the one or more computer processors, a first numerical identifier to the first glyph;

generating, by the one or more computer processors, first glyph data associated with the first glyph, the first glyph data comprising the first numerical identifier and the first vertical distance value;

determining, by the one or more computer processors, a second vertical distance value for the second glyph by determining a second vertical distance between the first horizontal reference line and the third horizontal reference line;

determining, by the one or more computer processors, that the second vertical distance value is different than the first vertical distance value;

assigning, by the one or more computer processors, a second numerical identifier to the second glyph, wherein the second numerical identifier is different from the first numerical identifier;

generating, by the one or more computer processors, second glyph data associated with the second glyph, the second glyph data comprising the second vertical distance value;

generating, by the one or more computer processors, a font file configured to be executed by a renderer to render the source text, the font file comprising the vector image, the first glyph data, and the second glyph data; and generating, by the one or more computer processors, a digitally renderable format for the source text based at least in part on the font file and the scanned image.

2. The method of claim 1, wherein the character is a first character, the method further comprising:

identifying, by the one or more computer processors, a third glyph corresponding to an instance of a second character adjacent to the first instance of the first character in the first word and a fourth glyph corresponding to an instance of a third character adjacent to the second instance of the first character in the second word;

determining, by the one or more computer processors, that the second character and the third character are a same character;

determining, by the one or more computer processors, a first vertical reference line indicative of a default horizontal alignment of the first instance of the first character on the second horizontal reference line with respect to the first group of characters, wherein the first vertical reference line indicates an origin of the first instance of the first character;

determining, by the one or more computer processors, a second vertical reference line indicative of a horizontal alignment of the second instance of the first character on the third horizontal reference line with respect to the second group of characters, and a third vertical reference line indicative of a default horizontal alignment of the second group of characters;

determining, by the one or more computer processors, a first horizontal distance value for the third glyph by determining a horizontal distance between the first vertical reference line and the second vertical reference line;

assigning, by the one or more computer processors, a third numerical identifier to the third glyph;

generating, by the one or more computer processors, third glyph data associated with the third glyph, the third glyph data comprising the third numerical identifier and the first horizontal distance value;

determining, by the one or more computer processors, a second horizontal distance value for the fourth glyph by determining a second horizontal distance between the second vertical reference line and the third vertical reference line;

determining, by the one or more computer processors, that the second horizontal distance value is different than the first horizontal distance value;

assigning, by the one or more computer processors, a fourth numerical identifier to the fourth glyph, wherein the fourth numerical identifier is different from the third numerical identifier; and generating, by the one or more computer processors, fourth glyph data associated with the fourth glyph, the fourth glyph data comprising the second horizontal distance value;

wherein the font file further comprises the third glyph data and the fourth glyph data.

3. The method of claim 1, further comprising:

determining, by the one or more computer processors, that the first instance of the character has a first resolution;

determining, by the one or more computer processors, that the second instance of the character has a second resolution that is less than the first resolution; and upscaling, by the one or more computer processors, the second character to the first resolution, such that each instance of the character is at the first resolution.

4. A method comprising:

receiving, by one or more computer processors, a scanned image of a source text, the scanned image comprising a first glyph and a second glyph, wherein the first glyph and the second glyph correspond to a first instance and a second instance of a character in the source text, respectively, and wherein the first instance of the character appears in a first word of the source text and the second instance of the character appears in a second word of the source text;

generating, by the one or more computer processors, an image representative of each of the first glyph and the second glyph;

determining, by the one or more computer processors, a first positional reference line indicative of a default position of a first character along a horizontal or vertical baseline, wherein the default position indicates an origin of the first character;

determining, by the one or more computer processors, a second positional reference line indicative of an alignment of characters forming the first word and a third positional reference line indicative of an alignment of characters forming the second word;

determining, by the one or more computer processors, a first distance value between the first positional reference line and the second positional reference line;

assigning, by the one or more computer processors, a first numerical identifier to the first glyph;

generating, by the one or more computer processors, first glyph data associated with the first glyph, the first glyph data comprising the first numerical identifier and the first distance value;

generating, by the one or more computer processors, a font file configured to be executed by a renderer to render the source text, the font file comprising the image and the first glyph data; and generating, by the one or more computer processors, a digitally renderable format for the source text based at least in part on the font file and the scanned image.

5. The method of claim 4, further comprising:

determining, by the one or more computer processors, a second distance value between the first positional reference line and the third positional reference line;

determining, by the one or more computer processors, that the second distance value is different than the first distance value;

assigning, by the one or more computer processors, a second numerical identifier to the second glyph, wherein the second numerical identifier is different from the first numerical identifier; and generating, by the one or more computer processors, second glyph data associated with the second glyph, the second glyph data comprising the second distance value;

wherein the font file further comprises the second glyph data.

6. The method of claim 5, wherein:

the first positional reference line is a first horizontal line indicative of a vertical alignment of the first character;

the second positional reference line is a second horizontal reference line indicative of a vertical alignment of a first group of characters forming the first word;

the third positional reference line is a third horizontal reference line indicative of a vertical alignment of a second group of characters forming the second word; and the first distance value for the first glyph is a first vertical adjustment for the first glyph between the first horizontal reference line and the second horizontal reference line.

7. The method of claim 5, wherein:

the first positional reference line is a first vertical reference line indicative of a horizontal alignment of the first character;

the second positional reference line is a second vertical reference line indicative of a horizontal alignment of a first group of characters forming the first word;

the third positional reference line is a third vertical reference line indicative of a horizontal alignment of a second group of characters forming the second word; and the first distance value for the first glyph is a first horizontal adjustment for the first glyph between the first vertical reference line and the second vertical reference line.

8. The method of claim 5, wherein the first numerical identifier and the second numerical identifier are custom Unicode values selected from a Private Use Area range of code points.

9. The method of claim 4, wherein the image is a vector image.

10. The method of claim 4, further comprising scaling, by the one or more computer processors, the first glyph and the second glyph to a uniform resolution.

11. The method of claim 4, further comprising:

identifying, by the one or more computer processors, the character by analyzing the scanned image;

identifying, by the one or more computer processors, a first bounding region encompassing the character;

based at least in part on the first bounding region, extracting, by the one or more computer processors, each instance of the character from the scanned image to generate an extracted character; and generating, by the one or more computer processors, the image representative of the character by converting the extracted character to a vector image.

12. The method of claim 11, further comprising categorizing, by the one or more computer processors, each instance of the character in a first bin such that characters in the first bin are associated with a single image, wherein characters are binned based at least in part on a threshold variance between binned characters.

13. The method of claim 4, further comprising:

determining, by the one or more computer processors, that the first word and the second word are positioned on a first line of text in the source text;

increasing, by the one or more computer processors, a glyph size of the first instance of the first character; and shifting, by the one or more computer processors, the second word from a first rendered line of text to a second rendered line of text.

14. The method of claim 4, further comprising rendering the source text on a display based at least in part on the scanned image and the font file.

15. A computer device comprising:

at least one memory that stores computer-executable instructions;

at least one processor configured to access the at least one memory and execute the computer-executable instructions to:

receive a scanned image of a source text, the scanned image comprising a first glyph and a second glyph, wherein the first glyph and the second glyph correspond to a first instance and a second instance of a character in the source text, respectively, and wherein the first instance of the character appears in a first word of the source text and the second instance of the character appears in a second word of the source text;

generate an image representative of each of the first glyph and the second glyph;

determine a first positional reference line indicative of a default positioning of a first character along a horizontal or vertical baseline;

determine a second positional reference line indicative of an alignment of characters forming the first word and a third positional reference line indicative of an alignment of characters forming the second word;

determine a first distance value between the first positional reference line and the second positional reference line;

assign a first numerical identifier to the first glyph;

generate first glyph data associated with the first glyph, the first glyph data comprising the first numerical identifier and the first distance value;

generate a font file configured to be executed by a renderer to render the source text, the font file comprising the image and the first glyph data; and generate a digitally renderable format for the source text based at least in part on the font file and the scanned image.

16. The computer device of claim 15, wherein the at least one processor is further configured to execute the computer-executable instructions to:
   determine a second distance value between the first positional reference line and the third positional reference line;
   determine that the second distance value is different than the first distance value;
   assign a second numerical identifier to the second glyph, wherein the second numerical identifier is different from the first numerical identifier; and
   generate second glyph data associated with the second glyph, the second glyph data comprising the second distance value;
   wherein the font file further comprises the second glyph data.

17. The computer device of claim 16, wherein:
   the first positional reference line is a first horizontal line indicative of a vertical alignment of the first character;
   the second positional reference line is a second horizontal reference line indicative of a vertical alignment of a first group of characters forming the first word;
   the third positional reference line is a third horizontal reference line indicative of a vertical alignment of a second group of characters forming the second word; and
   the first distance value for the first glyph is a first vertical adjustment for the first glyph between the first horizontal reference line and the second horizontal reference line.

18. The computer device of claim 16, wherein:
   the first positional reference line is a first vertical reference line indicative of a horizontal alignment of the first character;
   the second positional reference line is a second vertical reference line indicative of a horizontal alignment of a first group of characters forming the first word;
   the third positional reference line is a third vertical reference line indicative of a horizontal alignment of a second group of characters forming the second word; and
   the first distance value for the first glyph is a first horizontal adjustment for the first glyph between the first vertical reference line and the second vertical reference line.

19. The computer device of claim 15, wherein the at least one processor is further configured to execute the computer-executable instructions to render the source text on a display based at least in part on the scanned image and the font file.

20. The computer device of claim 15, wherein the image is a vector image.

* * * * *